United States Patent

Johnson

[15] 3,661,212
[45] May 9, 1972

[54] GARDEN TRACTOR

[72] Inventor: Fred Lee Johnson, Route 2, Box 14, New Bern, N.C.

[22] Filed: Oct. 22, 1970

[21] Appl. No.: 83,022

[52] U.S. Cl. ............................................. 172/258, 172/292
[51] Int. Cl. ................................... A01b 69/00, A01b 51/00
[58] Field of Search ........................... 172/292, 256, 258, 42; 180/19 R; 280/47.11

[56] References Cited

UNITED STATES PATENTS

| 1,307,327 | 6/1919 | Van Nort | 172/256 X |
| 1,322,028 | 11/1919 | Lehman et al. | 172/258 |
| 1,612,823 | 1/1927 | Keese | 180/19 R |

*Primary Examiner*—Robert E. Pulfrey
*Assistant Examiner*—Stephen C. Pellegrino
*Attorney*—Bacon & Thomas

[57] ABSTRACT

An engine and transmission assembly, within a traction wheel, is suspended by hollow trunnions on which the traction wheel is journalled. An inverted U-shaped yoke, fixed to the trunnions, straddles the wheel and combined draft, stabilizing and steering means connect the yoke to an implement frame for relative tilting about a fore-and-aft axis and for steering the wheel relative to the frame. A reaction member is universally pivoted to the top of the yoke and is connected to the implement frame. Articulated controls for the engine and transmission extend from the implement frame through the hollow trunnions.

13 Claims, 10 Drawing Figures

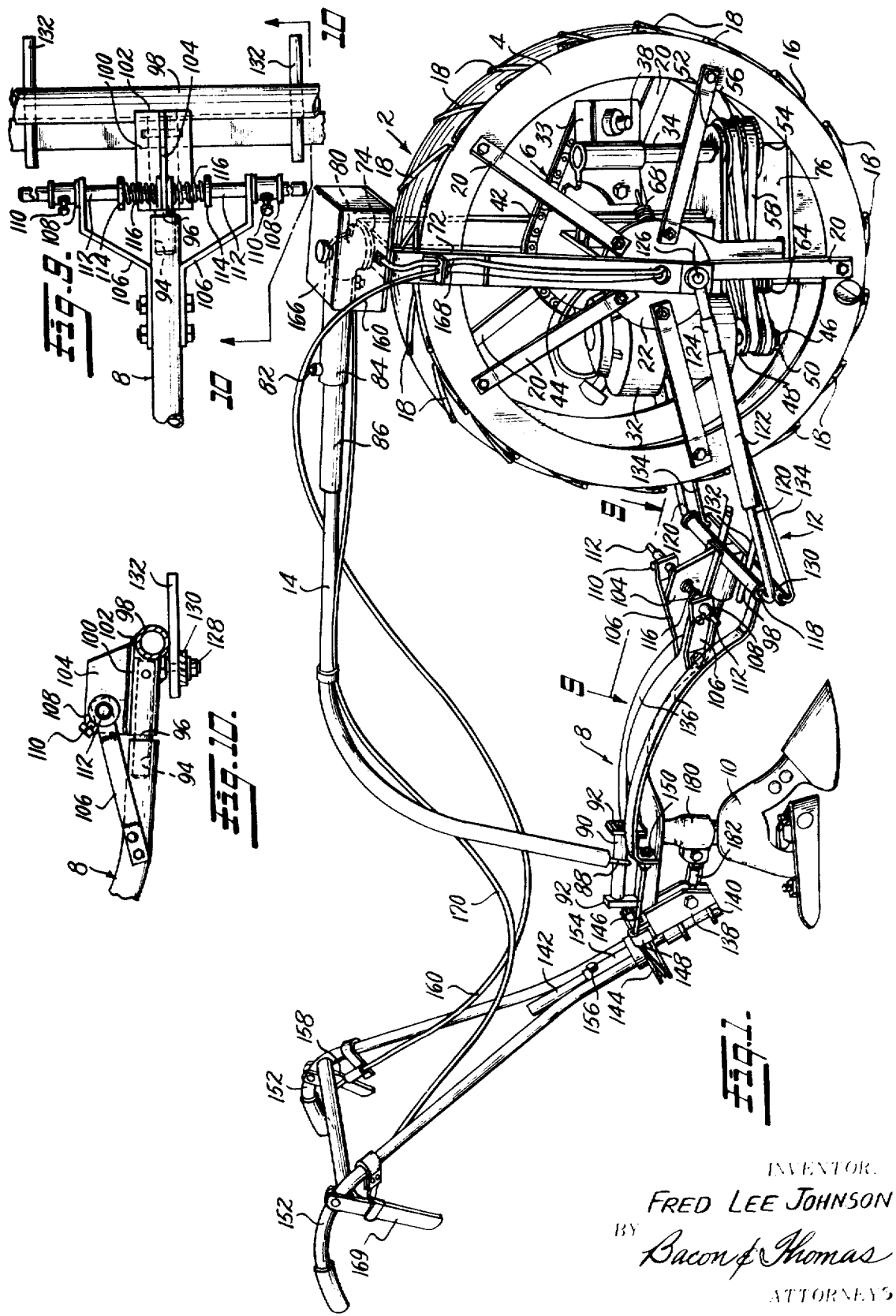

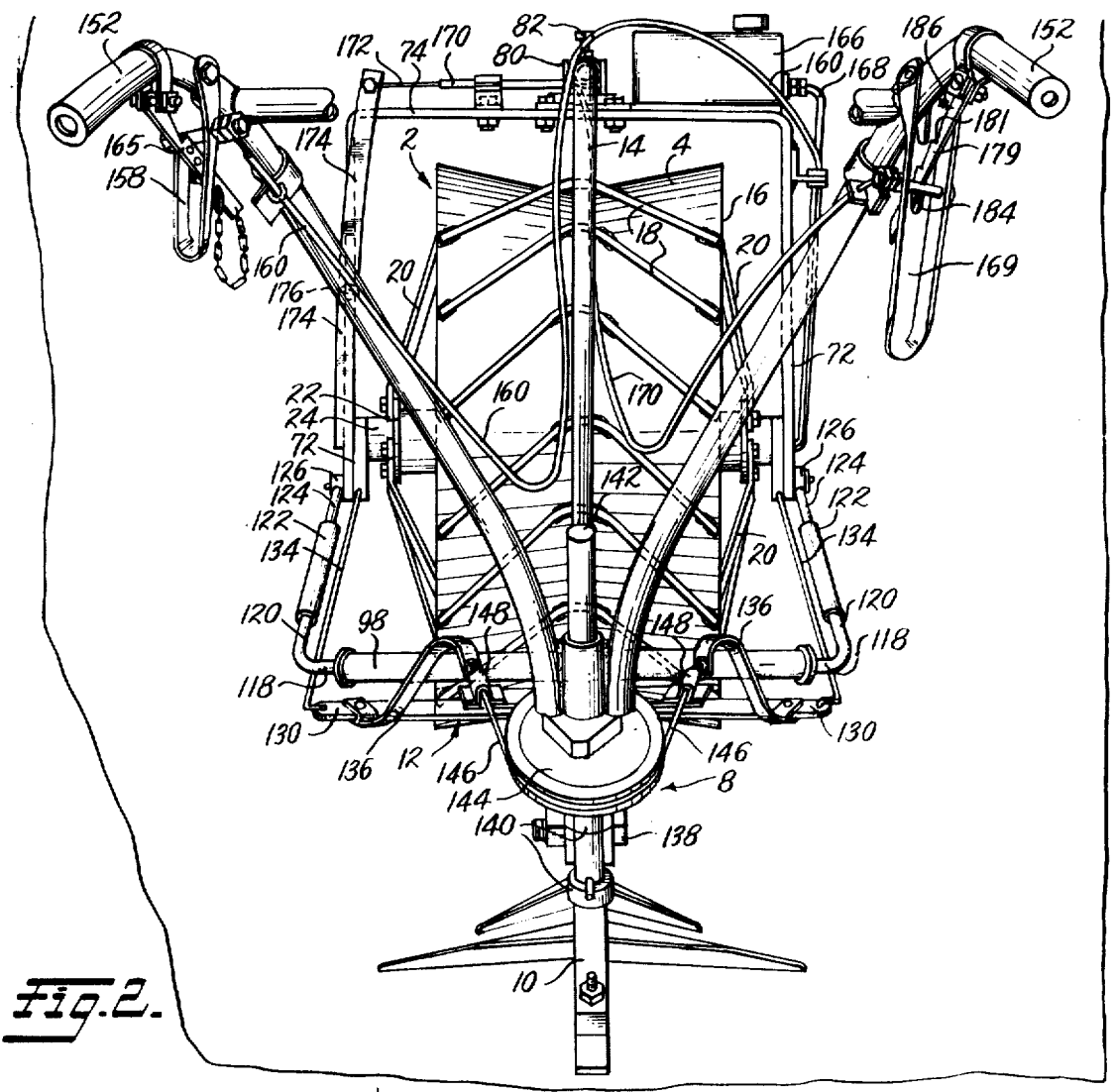

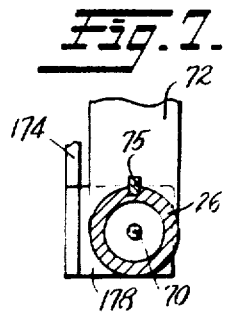
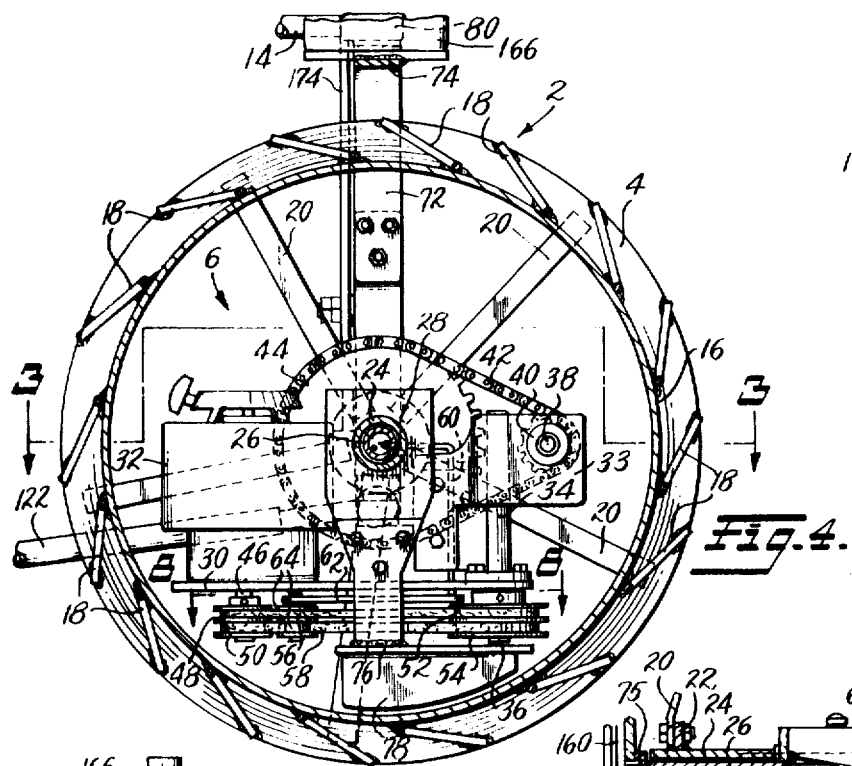
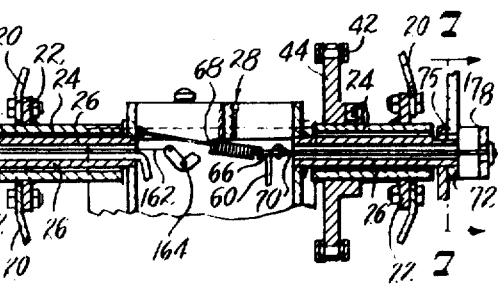
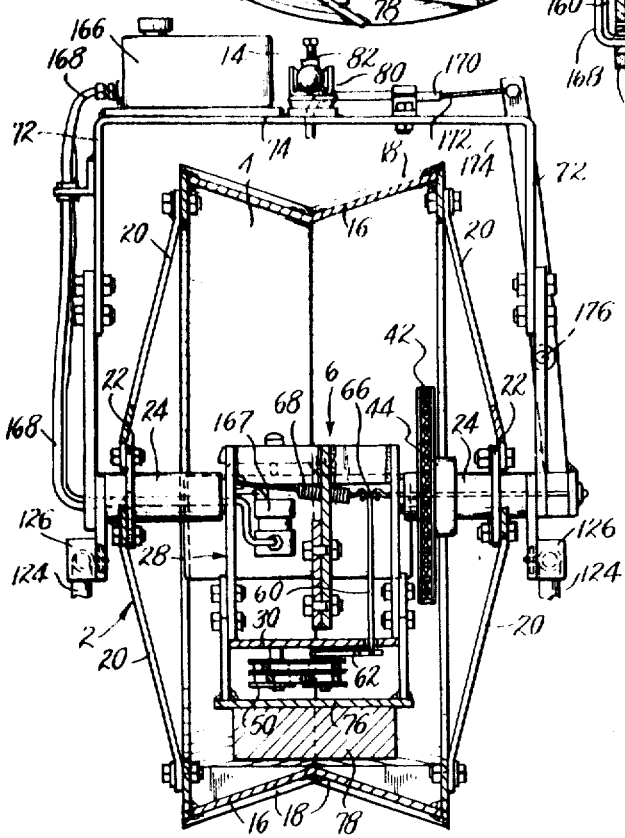
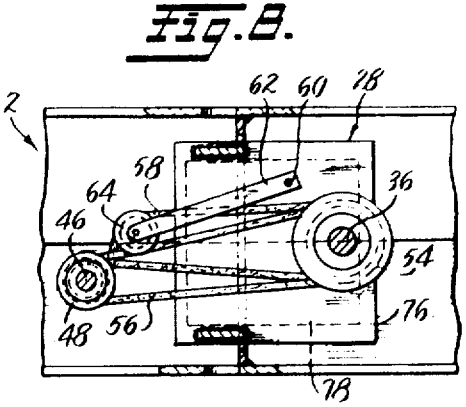
INVENTOR
FRED LEE JOHNSON
BY Bacon & Thomas
ATTORNEYS

3,661,212

GARDEN TRACTOR

BACKGROUND OF THE INVENTION

This invention relates to single wheel garden tractors coupled to an implement frame.

Single wheel garden tractors coupled to implement frames have been proposed heretofore but in most such proposals the implement frame and traction wheel were rigidly connected together, thus making it necessary to manually lift the implement from the ground for steering the tractor. In other proposals a steering hinge was provided but no provision was made for relative tilt between the single wheel and the implement frame.

SUMMARY OF THE INVENTION

The present invention comprises a traction unit wherein a pendulously suspended motor assembly is mounted within a traction wheel and is coupled to an implement frame by means of a steering and stabilizing linkage, the steering being accomplished through the draft connections by which the traction wheel pulls the implement frame forwardly. The reaction assembly connected to the motor is also connected to the implement frame to overcome motor reaction and to ensure that all torque developed thereby is transmitted to the traction wheel. The traction wheel assembly and reaction means are connected to the implement frame by lost motion means and articulated joints and the motor is provided with a heavy weight tending to stabilize it in a vertical position, the assembly thus providing for elimination of shock loads on the motor in the event the implement engages an obstruction.

BRIEF DESCRIPTION OF THE DRAWINGS

FIG. 1 is a perspective view of a garden tractor assembly embodying the present invention;

FIG. 2 is a perspective view of the invention as viewed from the rear of FIG. 1;

FIG. 3 is a horizontal sectional view through the traction wheel assembly, taken on the line 3—3 of FIG. 4;

FIG. 4 is a vertical sectional view taken on the line 4—4 of FIG. 3;

FIG. 5 is a vertical sectional view taken on the line 5—5 of FIG. 3;

FIG. 6 is a fragmentary vertical sectional view taken on the line 6—6 of FIG. 3;

FIG. 7 is an enlarged fragmentary sectional view taken on the line 7—7 of FIG. 6;

FIG. 8 is a fragmentary horizontal sectional view taken on the line 8—8 of FIG. 4;

FIG. 9 is a fragmentary plan view of stabilizing means, as viewed from the line 9—9 of FIG. 1; and FIG. 10 is a vertical sectional view taken on the line 10—10 of FIG. 9.

DESCRIPTION OF A PREFERRED EMBODIMENT

Referring first to FIG. 1, numeral 2 indicates generally a traction assembly comprising a traction wheel 4 and an engine assembly 6. Numeral 8 indicates generally an implement frame on which an implement 10 is removably mounted. Numeral 12 indicates generally a steering, stabilizing and draft linkage connecting the traction assembly 2 to the implement frame 8. Numeral 14 indicates a reaction means, which will be described in greater detail hereafter.

The traction assembly 2 comprises a traction wheel 4 having a rim portion 16 of lesser diameter in its central plane than at its edges and having thereon a plurality of V-shaped cleats 18. This shape of wheel has been found to provide better traction whether the implement is used on hard or relatively soft ground. The wheel 4 also includes a plurality of generally radial spokes 20 extending from the rim 16 to hub plates 22 on each side of the wheel.

Referring now to FIG. 6, the hub plates 22 are secured, as by welding, to sleeves 24, which are in turn journalled on hollow trunnions 26. The trunnions 26 are fixed, as by welding, at their inner ends to an engine frame or sub frame 28 and extend outwardly through the sleeves 24. As seen in FIG. 4, the engine frame 28 includes a plate 30 on which a small internal combustion engine 32 is mounted, on one side of the axis of the wheel 4. On the other side of the axis of wheel 4 a reduction gear box 33 is mounted by means of a supporting tube 34 within which an input shaft 36 is journalled. An output shaft 38 of the gear box 33 has a drive sprocket 40 fixed thereon and which drives, through chain 42, to a sprocket wheel 44 securely fixed to one of the bearing sleeves 24 of the traction wheel 2 (FIG. 6).

The output or crank shaft 46 of the internal combustion engine 32 has two pulleys 48 and 50 fixed thereon. In alignment with the respective pulleys 48 and 50, a pair of pulleys 52 and 54 are fixed to the input shaft 36 of the gear box 33 and belts 56 and 58 are loosely trained over aligned pulleys on the respective shafts 36 and 46. Referring now to FIG. 8, it will be seen that the belt 56 is merely trained over its aligned pulleys in the conventional manner whereas the belt 58 is crossed between its aligned pulleys. Both belts are normally sufficiently loose so that rotation of the shaft 48 can transmit substantially no torque to the shaft 36.

Journalled on the engine frame 28 is a vertical rock shaft 60 to which an arm 62 is fixed. The arm 62 has a pair of idler pulleys 64 journalled on its free end, there being one pulley 64 in position to engage a respective one of the belts 56 or 58. In a neutral position, the pulleys 64 do not tighten either belt and the traction assembly is, therefore, in "neutral." However, by rocking the shaft 60 in either direction, one of the pulleys 64 is caused to engage one or the other of the belts 56 or 58 and to tighten the same sufficiently to effect driving a traction wheel. When the belt 56 is tightened, the traction wheel is driven in a forward direction whereas when the crossed belt 58 is tightened the traction wheel is driven in reverse. As shown in FIG. 6, the upper end of rock shaft 60 has a lever 66 fixed thereon and a spring 68 normally urges the lever 66 to rock the shaft 60 in a direction to place the transmission in forward drive. An actuating link 70 extends from the lever 66 outwardly through the hollow trunion 26.

Fixed to the outer ends of the hollow trunnions 26 are upstanding legs 72 of an inverted U-shaped yoke having a top member 74 joining the upper ends of the legs 72.

As seen in FIG. 7, the legs 72 of the yoke are rigidly fixed to the outer ends of the trunnions 26, such as by welding, and by means of a suitable key 75. Thus, the inverted U-shaped yoke is in rigid, fixed relation to the engine assembly. As further seen in FIGS. 4 and 5, the engine frame 28 includes a lower platform 76 to which is fixed a substantial weight mass 78 formed preferably of lead or similar heavy material.

The top member 74 of the yoke carries a portion of a ball and socket joint 80 and the reaction beam 14 is provided with the other portion of the ball joint 80 so that the beam 14 is universally connected to the top member 74 of the yoke. As shown in FIG. 1, the reaction beam 14 is adjustable in length and can be fixed at a desired length by means of a set screw 82 threaded through a tubular member 84 and engaging a member 86 telescopically received therein. The rear end of the reaction beam 14 is curved downwardly, as shown, and terminates in a loop 88 slidably embracing a rod 90 fixed to the implement frame 8 by rigid brackets 92.

Thus, the reaction beam 14 is connected to the implement frame 8 for limited fore-and-aft sliding movement and also for lateral pivotal movement about the rod 90.

At its forward end, the implement frame 8 is provided with a fore-and-aft socket 94 therein (see FIGS. 9 and 10), in which is slidably journalled a rod 96 rigidly fixed to a transverse tubular member 98, such as by welding to a plate 100, which in turn is welded, at 102, to the tubular member 98. Also welded to plate 101 is an upstanding plate 104. Securely bolted to the forward end of the implement beam 8 is a pair of brackets 106, each provided with a sleeve 108 adjacent its forward end. Each of the sleeves is provided with a set screw 110 by means of which bars 112 may be selectively adjusted toward and from the plate 104. Each of the bars 112 is provided with a head 114 bearing on compression springs 116, which bear at their inner ends against the upstanding plate 104. By this arrangement the force exerted by the springs 116 may be selectively adjusted.

Extending through the tubular member 98 is a generally U-shaped stabilizing bar 118 having forwardly converging leg portions 120. The leg portions 120 are telescopically received in tubular members 122 but are held against rotation therein by any suitable means. The tubular members 122 are fixed to links 124, which are in turn secured to the lower ends of the legs 72 of the inverted U-shaped yoke previously described. The connection between the links 124 and the legs 72 is by means of suitable universally pivotable connections, such as ball and socket joints 126.

Rigidly fixed to the transverse tubular member 98 is a pivot structure 128 substantially in vertical alignment with the axis of the swivel pin 96 and on which a transverse lever 130 is pivoted. Guide bars 132 are welded to the bottom of the tubular member 98 and along which opposite portions of the lever 130 may slide. Each end of the lever 130 is connected to a tension link 134 extending to and connected to the lower portion of a corresponding leg 72 of the yoke.

Also pivotally connected to the lever 130 is a pair of bowed tension members 136, which extend rearwardly from the lever 130 and are curved to generally the same configuration as the main beam of the implement frame 8.

Rigidly fixed to the implement beam 8 is a bracket structure 138 having bearing means 140 thereon. Journalled in the bearing means 140 is a shaft 142 on which a pulley 144 is rigidly fixed. A flexible cable 146 is trained about the pulley 144 and extends through fixed guides 148 forwardly to the rear ends of the tension members 136, to which the ends of the cable 146 are fixed by means indicated generally at 150.

A pair of handle bars 152 is arranged as shown in FIGS. 1 and 2 and fixed at their lower forward end to a sleeve 154 slidably adjustable along the shaft 142 by means of a set screw or the like 156. Thus, the handle bars 152 can be vertically adjusted along the shaft 142 to accommodate the stature of the tractor operator who walks along behind the implement to effect control and operation thereof.

A control lever 158 is pivoted to one of the handle bars 152 and actuates a sliding wire within a bowdon cable 160, which extends loosely and forwardly to the top portion of one of the legs 72 of the yoke, previously described and which then extends downwardly therealong and through hollow trunnion 24 (see FIG. 6) where the sliding wire 162 thereof is arranged to actuate a throttle control 164 for the internal combustion engine 32. A perforated and notched lever 165 adjacent the control 158 provides for locking the control 158 in a desired position.

Fixed to the top member 74 of the yoke is a fuel tank 166 and a fuel line 168 leads from the tank 166 downwardly along a vertical leg of the yoke and through hollow trunnion 24 where it is connected to the fuel inlet of the engine carburetor 167 (FIG. 5).

Pivoted to the other handle bar 152 is a second control lever 169 also connected to a bowdon cable 170 extending forwardly to the inverted yoke and whereat its movable wire 172 (see FIG. 5) is connected to the upper end of a lever 174 pivoted at 126 to the corresponding leg 72 of the yoke previously described. The lower end of the lever 172 is provided with a transverse plate 178 extending across the end of the hollow trunnion 24, as shown in FIGS. 6 and 7. The plate 178 engages the outer end of the rod 70 previously described. Thus, the control 169 can be swung rearwardly to shift the transmission from "forward" through "neutral" to "reverse." A lock lever 179 (FIG. 2) has notches 181 engageable with the edge of an opening 184 in lever 169 and held there by spring 186 to lock the transmission in any of the described positions.

From the structures thus far described it will be noted that the operator of the apparatus, through the control levers 158 and 169, may selectively control the speed of operation of the engine 32 and the transmission mechanism described with reference to FIG. 8. By actuating the control lever 169 the lever 174 is caused to rock about its pivot 176 and to cause the rod 170 to move the lever 66 to rock the shaft 60 and swing idler pulleys 64 in the direction desired to effect either forward or reverse driving of the input shaft to the gear box 32.

Assuming that the engine 32 is running and the transmission is set to rotate the traction wheel 4 in a forward direction, the chain 42 may effect such forward drive while the weight of the engine assembly and the weight of mass 78 normally holds the engine assembly in a substantially vertical position. The traction rods 134 connected to the lower ends of the legs 72 and thus placed in tension and, through the lever 130 and members 136 and cable 146, a forward draft force is applied to the implement frame 8 to propel the implement frame in a forward direction. Obviously, rotation of the handle bars 152 and shaft 142 within the bearing means 140 causes the pulley 144 to rotate and through cable 146 and members 136, this will cause the lever 130 to swing about its pivot 128 and effect steering of the traction assembly in a lateral direction about a vertical axis passing through the ball and socket joint 80 between the reaction member 14 and the yoke, without tensioning or modifying the draft force applied to the implement frame through the described steering mechanism.

It will further be obvious that the universal connection between the reaction member 14 and the implement frame, already described, along with the pivot structure comprising the socket 94 at the forward end of the implement frame and the pin 96 permits the traction wheel assembly to tilt laterally about the fore-and-aft axis defined by pin 96, relative to the implement frame. This tilting capability renders the apparatus highly flexible and permits the wheel to tilt slightly in one direction or the other without enforcing similar tilting of the implement frame and the implement thereon. However, when such tilting occurs, the vertical plate 104 also tilts about the axis of socket 94 but such tilting is resisted by the springs 116, already described, and such tilt is, therefore, controlled and of a resilient nature. Tilting of the wheel 4 and its yoke in the manner referred to is transmitted to the plate 104 through the stabilizing means comprising tubular member 98, rod 118 and its legs 120 and tubular members 122 and links 124. This assembly enforces tilting of the member 98 and plate 104 in response to tilting of the wheel assembly but does not interfere with steering movement of the wheel 4 about a vertical axis. Steering capability is ensured by means of the universal joints 126 and the fact that the sliding telescopic connection between rods 120 and tubes 122 is relatively loose and is further permitted by the forwardly converging relationship of the rods 120 and tubular members 122. Obviously, the reaction member 14 does not interfere either with steering movement of the traction wheel relative to the implement frame nor with tilting the traction wheel in the manner just described.

During normal forward movement of the apparatus the pendulous weight of the motor and transmission assembly is normally sufficient to hold that assembly in a generally vertical position against the torque created by driving the wheel 4. However, in the event the implement 10 impinges on an obstruction or in the event conditions are such that excessive torque is required to drive the tractor forwardly, reaction member 14 permits a slight tilt of the engine assembly about the axis of the wheel 4 but such tilt is limited by the length of the guide rod 90, previously described.

The implement 10, shown in the drawings, is a cultivating plow, but it is to be understood that any one of many different implements may be employed and it is intended that the implement supporting socket 180 be adapted to receive many different implements. The socket 180 is tiltably supported on the implement frame (by means not shown) and its degree of tilt may be adjusted by the turnbuckle device 182 whereby the forward tilt or attitude of the implement 10 may be adjusted.

While a single specific embodiment of the invention has been shown and described herein, the same is merely illustrative of the principles involved and the invention may encompass other modifications.

I claim:

1. A garden tractor comprising:
   an implement frame;
   a traction wheel forwardly of said implement frame and having a power source suspended therein about the axis of said wheel and drivingly connected to said wheel for rotating the same;
   reaction means interconnecting said power source and said implement frame for preventing rotation of said motor about said wheel axis;
   draft means joining said wheel and implement frame for pulling said frame forwardly in response to forward rolling motion of said wheel;
   stabilizing means connected to said wheel and having a pivotal connection, about a fore-and-aft axis on said implement frame; and
   resilient means between said implement frame and said stabilizing means for yieldably restraining pivotal movement of said wheel about said fore-and-aft axis.

2. A garden tractor as defined in claim 1 wherein said stabilizing means includes a member rigid therewith and extending laterally of said fore-and-aft axis, said resilient means comprising compression springs bearing on opposite sides of said member and reacting against said implement frame, and means for adjusting the compression of said springs.

3. A garden tractor as defined in claim 1 wherein said reaction means includes an inverted U-shaped yoke member straddling the top of said wheel and being rigidly fixed to said power source by journal means at the axis of said wheel, and a beam extending from the upper portion of said yoke to said implement frame, said beam being pivotally connected to said yoke about at least a vertical axis whereby said wheel and yoke may be steered about said vertical axis, relative to said frame.

4. A garden tractor as defined in claim 3 wherein said beam is connected to said implement frame for pivotal movement about a fore-and-aft axis and for limited sliding movement in a fore-and-aft direction.

5. A garden tractor as defined in claim 4 wherein said beam is connected to said yoke by a ball and socket joint.

6. A garden tractor as defined in claim 5 including a heavy weight mass fixed to said power source and positioned adjacent the bottom of said wheel, substantially below the axis thereof.

7. A garden tractor as defined in claim 3 wherein said stabilizing means includes laterally spaced guides extending forwardly from adjacent said implement frame, on opposite sides of said wheel, and links telescopically slidable along said guides and connected at their forward ends to said yoke member adjacent the axis of said wheel.

8. A garden tractor as defined in claim 7 wherein said guides converge forwardly toward said wheel and wherein said links are connected to said yoke by universal pivot means.

9. A garden tractor as defined in claim 3 wherein said draft means includes steering means comprising;
   a transversely extending lever pivoted, intermediate its ends, to said stabilizing means rearwardly of said wheel;
   tension members extending from the ends of said lever, on respectively opposite sides of said wheel and connected to said yoke member adjacent said wheel axis; and
   manually operable means on said implement frame for selectively swinging said lever in either direction about its pivot.

10. A garden tractor as defined in claim 9 wherein said manually operable means comprises a pulley journalled on said implement frame and handle means for rotating said pulley;
    cable means trained around said pulley with its ends extending forwardly from opposite sides thereof; and
    means connecting said cable ends to respectively opposite end portions of said transverse lever.

11. A garden tractor comprising:
    an implement frame;
    a traction wheel forwardly of said implement frame and having a power source suspended therein about the axis of said wheel and drivingly connected to said wheel for rotating the same;
    an inverted U-shaped yoke straddling the top of said wheel and having a reaction member pivoted to the top thereof and connected to said implement frame;
    means interconnecting said power source and said implement frame for preventing rotation of said power source about said wheel axis;
    articulated draft means extending from said yoke to said implement frame;
    said power source comprising a sub frame having thereon an internal combustion engine having throttle control means, a reversible power transmission for transmitting power from said engine to said wheel, and transmission control means;
    hollow tubular trunnions fixed to said sub-frame, on opposite sides thereof, said traction wheel being journalled on said trunnions and said yoke being rigidly secured to the outer ends of said trunnions; and
    manually operable actuating members on said implement frame and articulated means connected to said actuating members and extending from said actuating members to the top of said yoke then downwardly along the legs of said yoke and through said hollow trunnions and being connected, respectively, to said throttle control means and said transmission control means.

12. A garden tractor ad defined in claim 11 wherein an output shaft on said engine has a pair of drive pulleys fixed thereon and said transmission includes a pair of driven pulleys fixed on a single shaft;
    a pair of belts trained about respectively opposed drive and driven pulleys but sufficiently loosely to be normally incapable of driving said driven pulleys, one of said belts being crossed between said pulleys;
    said transmission control means comprising movable idler pulleys adapted to selectively engage and tighten said belts, said idler pulleys being movable in one direction to tighten one belf for drive in one direction and in the other direction to tighten the other belt for reverse drive, an intermediate position of said pulleys leaving both belts loose.

13. A garden tractor as defined in claim 11 including a fuel tank mounted atop said yoke and a fuel line extending downwardly from said tank and through one of said trunnions to said engine.

* * * * *